US012571510B1

(12) United States Patent
Qiao et al.

(10) Patent No.: US 12,571,510 B1
(45) Date of Patent: Mar. 10, 2026

(54) LED DROP-CEILING LIGHTING SYSTEM AND METHOD

(71) Applicant: JQ Industries Inc, Houston, TX (US)

(72) Inventors: Guang Qiao, Houston, TX (US); Chuanlin Qiao, Jiangmen (CN)

( * ) Notice: Subject to any disclaimer, the term of this patent is extended or adjusted under 35 U.S.C. 154(b) by 0 days.

(21) Appl. No.: 19/048,648

(22) Filed: Feb. 7, 2025

(51) Int. Cl.

| | |
|---|---|
| ***F21S 8/02*** | (2006.01) |
| ***F21S 4/20*** | (2016.01) |
| ***F21S 8/04*** | (2006.01) |
| ***F21V 19/00*** | (2006.01) |
| ***F21V 21/005*** | (2006.01) |
| ***F21V 21/04*** | (2006.01) |
| ***F21V 21/08*** | (2006.01) |
| ***F21V 23/00*** | (2015.01) |
| ***F21V 23/02*** | (2006.01) |
| ***F21V 23/06*** | (2006.01) |
| ***F21Y 103/20*** | (2016.01) |
| ***F21Y 115/10*** | (2016.01) |

(52) U.S. Cl.
CPC ................. *F21S 8/026* (2013.01); *F21S 4/20* (2016.01); *F21S 8/043* (2013.01); *F21V 19/0035* (2013.01); *F21V 19/004* (2013.01); *F21V 21/005* (2013.01); *F21V 21/048* (2013.01); *F21V 21/049* (2013.01); *F21V 23/001* (2013.01); *F21V 23/02* (2013.01); *F21V 23/06* (2013.01); *F21Y 2103/20* (2016.08); *F21Y 2115/10* (2016.08)

(58) Field of Classification Search
CPC .... F21S 8/026; F21S 8/043; F21S 4/28; F21S 4/20; F21V 19/0035; F21V 19/004; F21V 21/0832; F21V 23/001; F21V 23/02; F21V 23/06; F21V 21/005; F21V 29/70; F21V 21/042; F21V 21/048; F21V 21/049; F21Y 2103/20
USPC .......................................................... 362/147
See application file for complete search history.

(56) References Cited

U.S. PATENT DOCUMENTS

| | | | | |
|---|---|---|---|---|
| 9,360,180 B2 * | 6/2016 | Sorensen | .................. | F21S 8/06 |
| 11,512,466 B2 * | 11/2022 | Yeo | ......................... | E04B 9/241 |
| 12,247,707 B2 * | 3/2025 | Shao | ........................ | F17D 5/005 |
| 2009/0316391 A1 * | 12/2009 | Huang | .................... | A47F 3/001 362/133 |
| 2018/0259173 A1 * | 9/2018 | Porciatti | ............... | F21V 33/006 |
| 2022/0162856 A1 * | 5/2022 | Yeo | ....................... | F21V 21/048 |

* cited by examiner

*Primary Examiner* — Laura K Tso
(74) *Attorney, Agent, or Firm* — Bayou IP PLLC; Michael Spradley

(57) ABSTRACT

An Improved light-emitting diode lighting system is described. The system can comprise a plurality of elongated interconnectable light segments and a plurality of mounts. Each end of the light segment can comprise an integrated plug. Each mount can be configured to connect to and end of the light segments, and each mount can comprise an enclosure having an opening that comprises a first socket connector compatible with the plug. A bracket can extend from the enclosure such that when the mounts are assembled with the plurality of elongated interconnectable light segments, the brackets rest on a top surface of a drop ceiling system while the enclosure rests at least partially below the top surface of the drop ceiling system. One of the mounts can comprise a power cable capable of receiving power from an external power source and delivering the power to the elongated interconnectable light segments.

14 Claims, 14 Drawing Sheets

LED DROP-CEILING LIGHTING SYSTEM AND METHOD

BACKGROUND

This disclosure relates to an improved LED (Light Emitting Diode) drop-ceiling lighting system. The advancements in LED technology over the past two decades have revolutionized the lighting industry, particularly in the realm of drop-ceiling lighting. This transformation has been marked by significant improvements in energy efficiency, longevity, and the physical footprint of lighting fixtures.

Most notable advancements in LED technology are its remarkable energy efficiency and its impressive lifespan. LEDs consume significantly less power compared to traditional incandescent and fluorescent bulbs. This efficiency is a key factor in the widespread adoption of LEDs in both residential and commercial settings. Regarding lifespan, LED technology is peerless. Traditional incandescent bulbs typically last around 1,000 hours, while fluorescent bulbs last between 7,000 and 15,000 hours. In contrast, LED bulbs can last up to 50,000 hours or more. This longevity reduces the frequency of replacements, leading to lower maintenance costs and less environmental waste.

Another one of the most transformative aspects of LED technology is its ability to shrink the physical footprint of lighting fixtures. Traditional lighting solutions, such as fluorescent tubes, often required large fixtures that could take up significant ceiling space. For instance, a single fluorescent light fixture might occupy the space of two ceiling tiles, creating a bulky and less aesthetically pleasing appearance. LED technology, however, has enabled the development of much more compact and versatile lighting solutions. Modern LED panels and fixtures are designed to fit seamlessly into standard ceiling grids, often occupying only a fraction of the space required by their predecessors. This reduction in size is due to several factors:

a. Miniaturization of Components. Advances in LED manufacturing have led to smaller and more efficient diodes. These miniaturized components can produce the same amount of light as larger traditional bulbs, allowing for more compact fixture designs.

b. Integrated Design. LED fixtures often integrate multiple components, such as drivers and heat sinks, into a single unit. This integration reduces the overall size and complexity of the fixture.

c. Thermal Management. Effective thermal management is crucial for maintaining the performance and longevity of LEDs. Modern LED fixtures use advanced materials and designs to dissipate heat more efficiently, allowing for smaller and more compact designs.

However, reducing the footprint of drop ceiling lighting has not come without challenges. While the smaller footprint of LED fixtures offers many advantages, it has also had trouble fitting in, literally, to a ceiling system that has been the standard for well over half a century. One issue is that not taking up an entire ceiling tile can sometimes require cutting ceiling tiles to accommodate the light and complete the ceiling. This can be labor-intensive and may compromise the aesthetic integrity of the ceiling.

To address these issues, some LED solutions have been designed to follow along the edge of a grid square, allowing a standard ceiling tile to fit in the grid square even with the lighting installed. However, these solutions can be bulky and nearly as difficult to ship as their incandescent and fluorescent predecessors, detracting from the overall benefits of the LED drop-ceiling technology.

For these reasons, it would be advantageous to have an improved LED drop-ceiling lighting system.

SUMMARY

An Improved LED (light-emitting diode) lighting system is described. The system can comprise a plurality of elongated interconnectable light segments and a plurality of mounts. Each end of the light segment can comprise an integrated plug. Each of the mounts can be configured to connect to and end of the light segments, and each of the mounts can comprise an enclosure having an opening that comprises a first socket connector compatible with the plug. A bracket can extend from the enclosure such that when the plurality of mounts are assembled with the plurality of elongated interconnectable light segments, the brackets rest on a top surface of a drop ceiling system while the enclosure rests at least partially below the top surface of the drop ceiling system. One of the plurality of mounts can comprise a power cable. The power cable can be capable of receiving power from an external power source and delivering the power to the plurality of elongated interconnectable light segments.

DETAILED DESCRIPTION

Described herein is an improved LED drop-ceiling lighting system. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming but would nevertheless be a routine undertaking for those of ordinary skill in the field of the appropriate art having the benefit of this disclosure. Accordingly, the claims appended hereto are not intended to be limited by the disclosed embodiments but are to be accorded their widest scope consistent with the principles and features disclosed herein.

Figure 1:
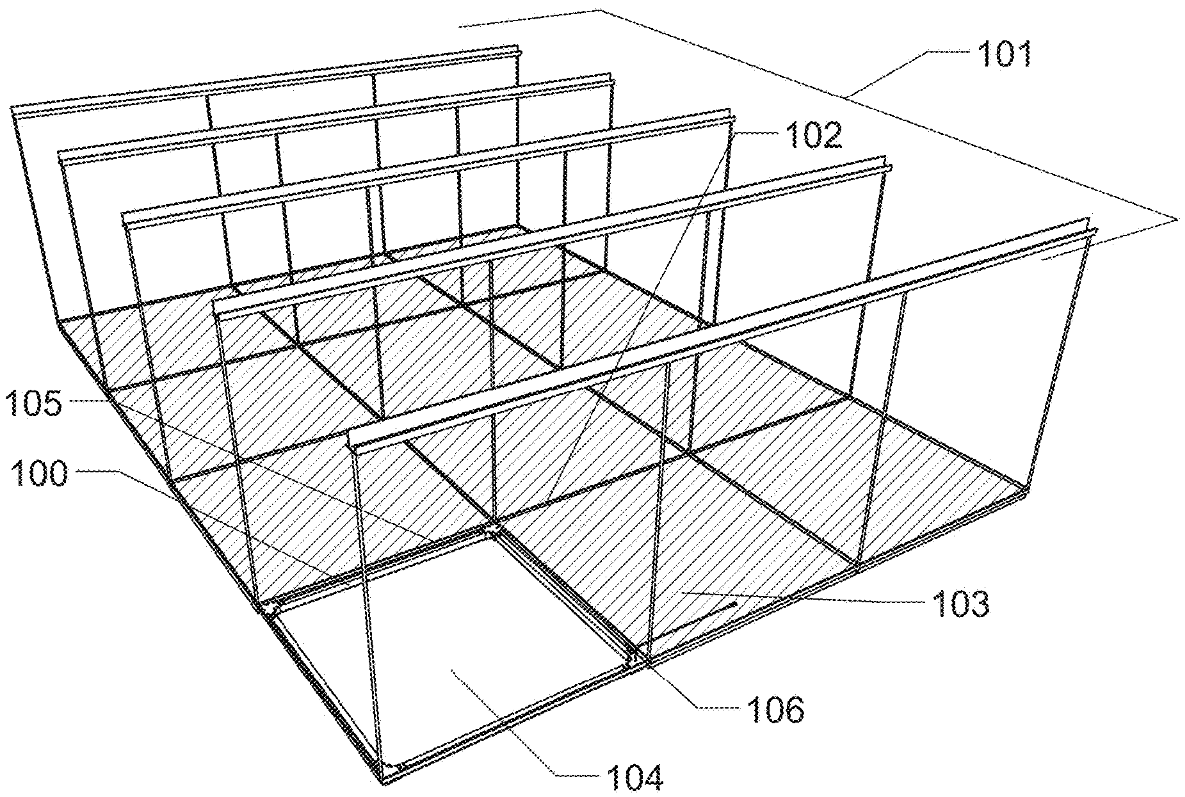
FIG. 1 illustrates a lighting system mounted to a drop ceiling system.

FIG. 1 illustrates a lighting system 100 mounted to a drop ceiling system 101. For purposes of this disclosure, drop ceiling system 101 refers to a suspended ceiling system, also known as a "second ceiling," which consists of ceiling tiles and a metallic structure suspended below the primary structural ceiling. Drop ceiling system 101 can comprise a grid frame 102 and a plurality of ceiling tiles 103. Grid frame 102 can consist of border panels, main beams, and cross-tees that intersect to form a plurality of modules 104. Each module 104 is a quadrilateral space created by the intersections of grid frame 102. Grid frame 102 can also comprise a plurality of ceiling grid 105 and lips 106. Ceiling grid 105 are the vertical structures that separate each module 104, while lips 106 are flat horizontal structures extending outward from wall borders 105, forming an L-shape within each module 104. Lips 106 can hold each ceiling tiles 103 in its suspended position within each module 104. Such structure of drop ceiling system 101 can be utilized to support the design of lighting system 100. Lighting system 100 can be designed to be integrated within modules 104 of the grid structure without disrupting the overall aesthetics of the ceiling.

Figure 2:
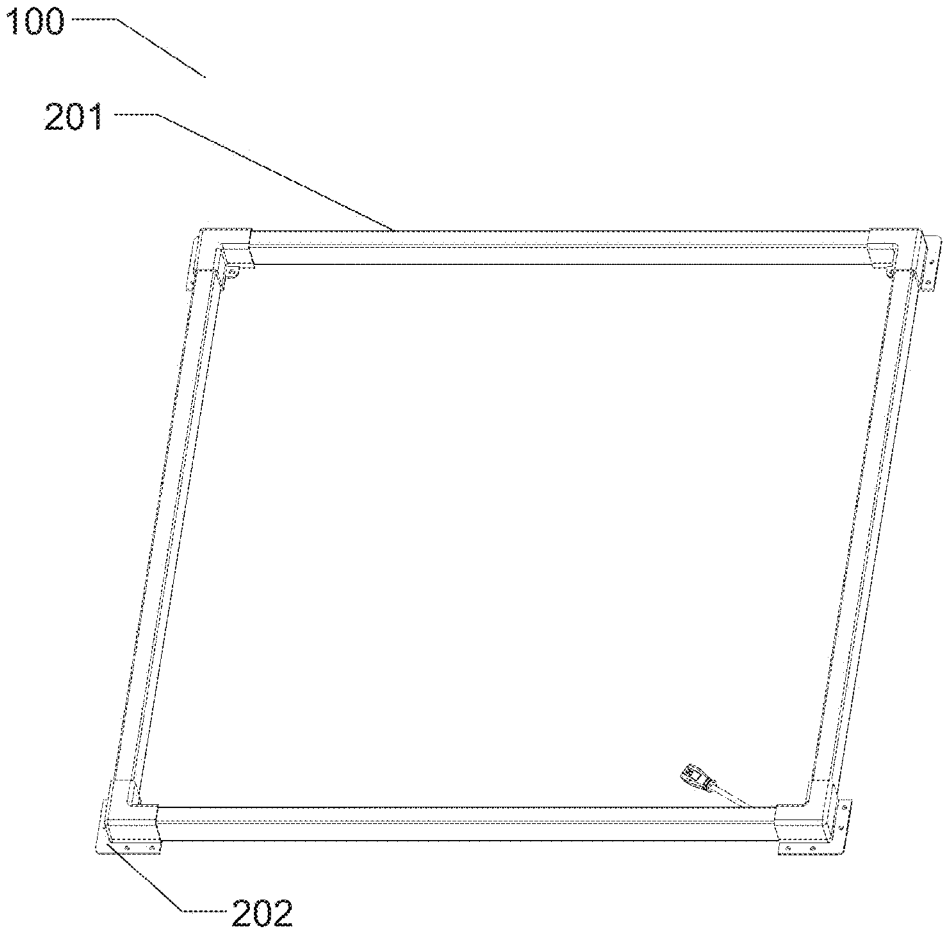
FIG. 2 illustrates a lighting system comprising a plurality of light segments and a plurality of mounts.

FIG. 2 illustrates lighting system 100 comprising a plurality of lights segments 201 and a plurality of mounts 202. Light segments 201 are elongated interconnectable units designed to be linked together, forming a flexible lighting system suitable to be used on a drop ceiling system 103. Each light segment 201 serves as an electric artificial light source, which may include a bulb, light-emitting diode (LED) module, and diffuser or lens. In a preferred embodiment, each light segment 201 can use LED modules that provides low power consumption and long lifespan. Each light segment 201 can be in various lengths, or sizes to meet different design requirements. Mounts 202 can link each light segment 201 together to form a desired lighting configuration on the ceiling. Additionally, each mount 202 serves as an electrical enclosure attached to the opposite ends of light segments 201, which is designed to protect and ensure continuous flow of power and control signals between segments. In this example embodiment, mounts 202 are L-shaped, but may take other forms depending on the configuration required for the lighting system.

Figure 3:
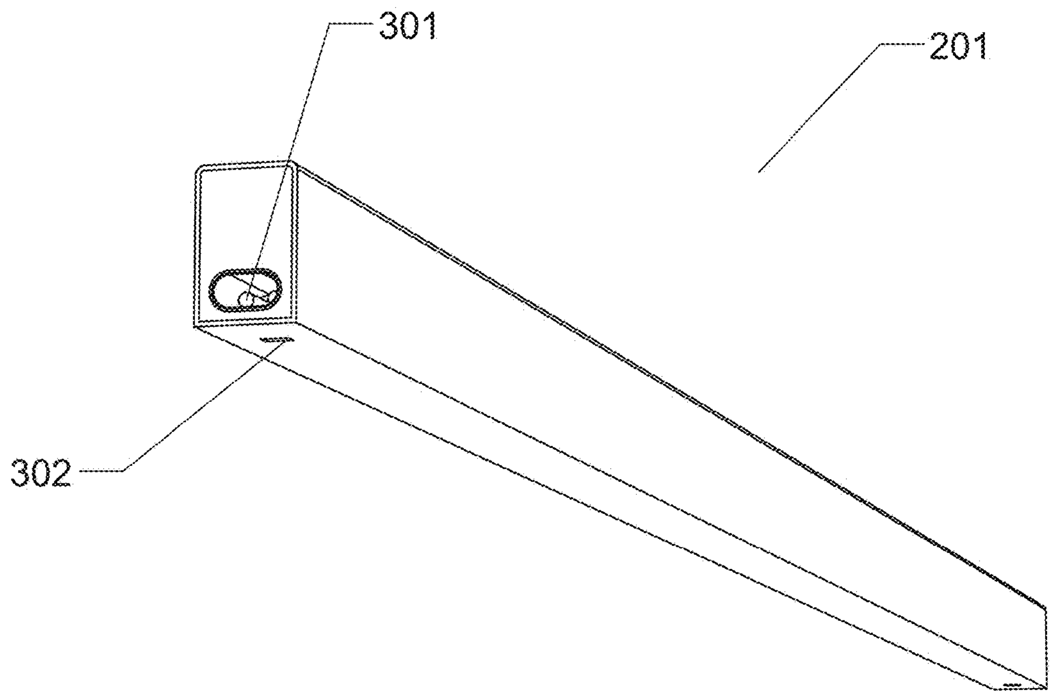
FIG. 3 illustrates an embodiment of a light segment.

FIG. 3 illustrates an embodiment of light segment 201. Each of the opposite ends of light segment 201 can comprise an integrated plug 301 and a first fastener 302. Plug 301 at each end of light segment 201 is designed to connect with mount 202. First fastener 302 is a part of a quick-release mechanism that is compatible with a second fastener, enabling secure attachment of light segment 201 to mount 202. In this embodiment, first fastener 302 can be holes that acts as a catch for the second fastener on mount 202.

Figure 4:
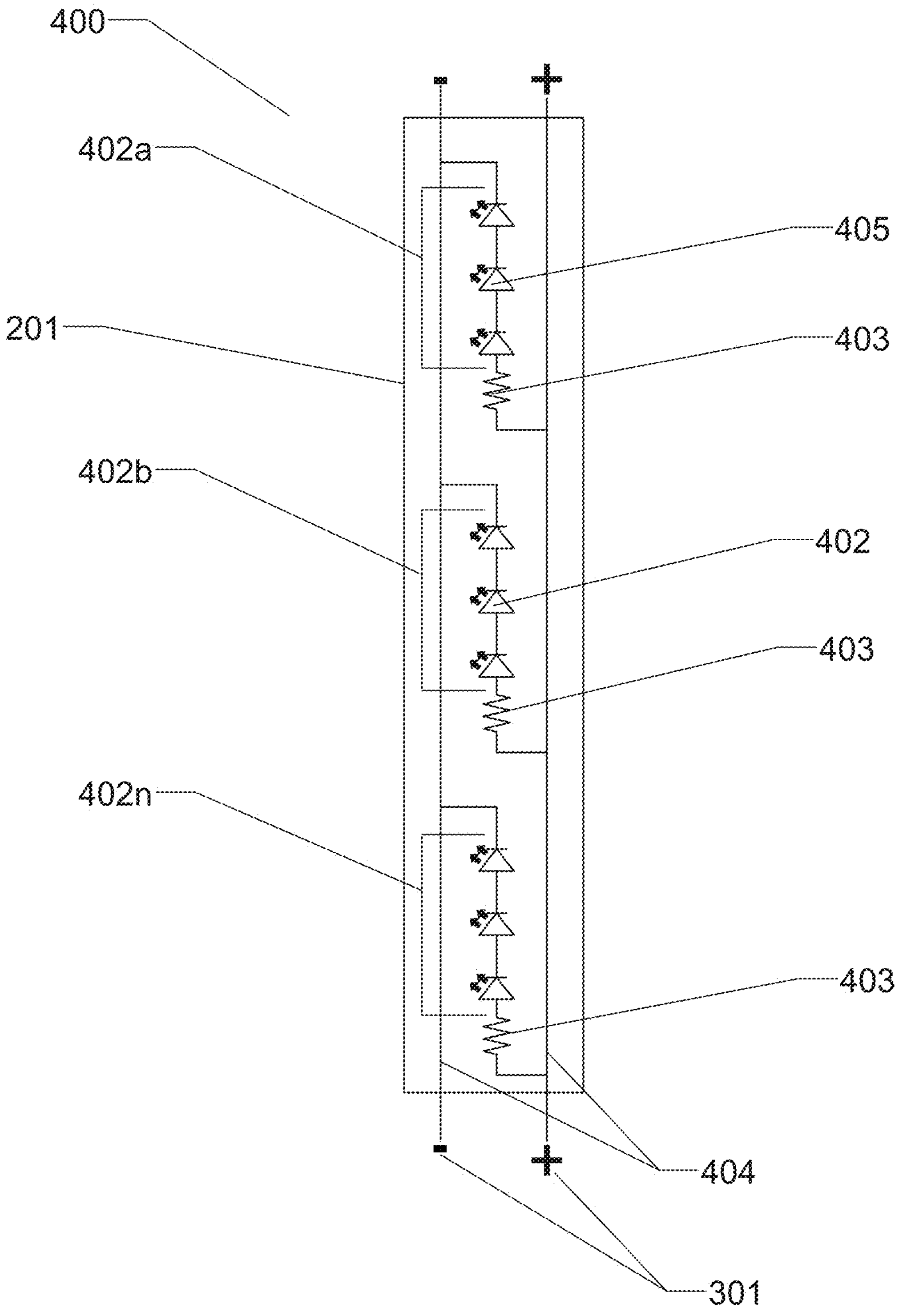
FIG. 4 illustrates an exemplary circuit diagram of a light segment.

FIG. 4 illustrates an exemplary circuit diagram 400 of light segment 201. In this embodiment, the circuit can comprise terminal or plug 301, one or more LED strips 402, one or more resistors 403, and connecting wires 404 arranged in a combination of series and parallel connection. Each LED strip 402 can comprise a plurality of LED lights 405. The positive output from plug 301 connects to the positive of a first LED strip 402*a*. The negative of first LED strip 402*a* is then connected to the positive of a second LED strip 402*b*. This pattern continues, with the negative connection of second LED strip 402*b* connecting to the positive connection of a last LED strip 402*n*. Finally, the negative connection of last LED strip 402*n* connects back to the negative of plug 301, creating a continuous circuit loop.

Additionally, the positive output of each LED strip 402 is connected to its respective resistor 403, which then connects to the positive connection of plug 401. The negative connections of all LED strips 402 are collectively linked to the negative connection of plug 401. This arrangement ensures that the LED lights are properly powered while allowing for current regulation through the resistors, enhancing the overall efficiency and safety of the circuit.

Further in one embodiment, each light segment 201 can feature an adjustable brightness allowing lighting system 100 to be dimmed to suit various activities or moods. In this embodiment, resistor 403 can be utilized to limit or control the brightness of light segment 201. In other embodiments, light segment 201 can come in various color temperature options, such as warm white, cool white, and daylight options to create a desired ambiance on a room or facility. In such embodiment, each LED strip 402 can comprise different semiconductor materials and phosphor coatings.

Figure 5:
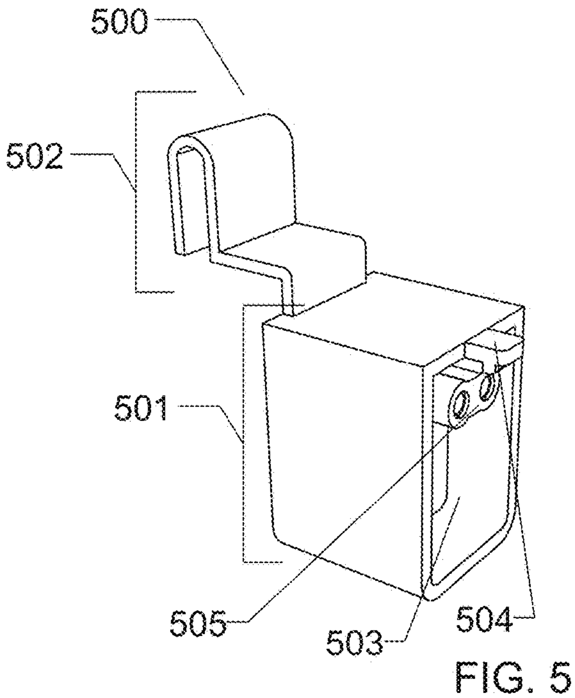
FIG. 5 illustrates an embodiment of a mount as an end cap single-connector.

FIG. 5 illustrates an embodiment of mount 202 as an end cap single-connector 500. End cap single-connector 500 connects to only one side of light segment 201, rather than joining two light segments 201. Additionally, end cap single-connector 500 can cover the end of light segment 201, ensuring that the terminating end of light segment 201 is securely sealed. This configuration allows for a straight-line lighting system design.

Further, mount 202 can comprise an enclosure 501 and a bracket 502. Enclosure 501 houses and protects the internal components of mount 202. Enclosure 501 can comprise an opening 503 on one end, while bracket 502 is attached at the opposite end. Opening 503 can comprise a second fastener 504 and a socket connector 505. Second fastener 504 serves as the counterpart of the quick-release mechanism that connects with first fastener 302. In this embodiment, second fastener 504 can form a protruding portion that acts as a latch or a clip, compatible with first fastener 302 on light segment 101. Socket connector 505 comprises holes that is compatible with plug 301 of light segments 201. Bracket 502 can allow light segment 201 to be mounted on drop ceiling system 101. In this embodiment, bracket 502 can have an inverted U-shaped form, which can serve as a hook allowing lighting system 100 be mounted on ceiling grid 105.

Figure 6:
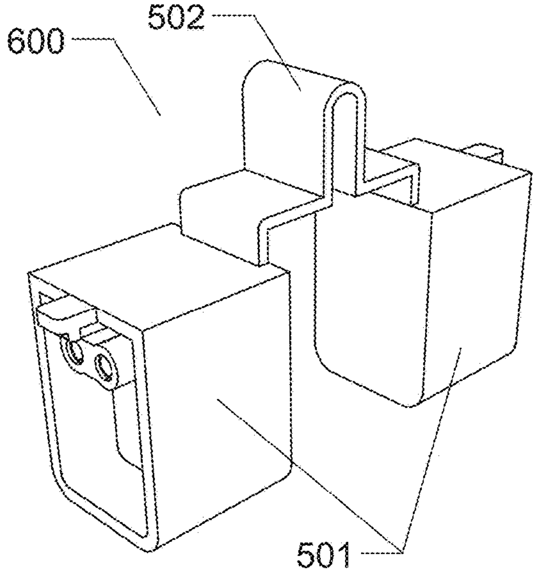
FIG. 6 illustrates an embodiment of mount as a linear dual-connector.

FIG. 6 illustrates an embodiment of mount 202 as a linear dual-connector 600. Linear dual-connector 600 links two light segments 201 in a straight-line configuration. In this embodiment, mount 202 can comprise two separate enclosures 501, attached to the opposite ends of bracket 502. Bracket 502 can have an inverted T-shape, with each end connecting the backside of each enclosure 501. In this configuration, the backsides of enclosures 501 face each other, while the front ends of each enclosure 501 that comprises socket connector 505 faces outward and away from each other.

Figure 7:
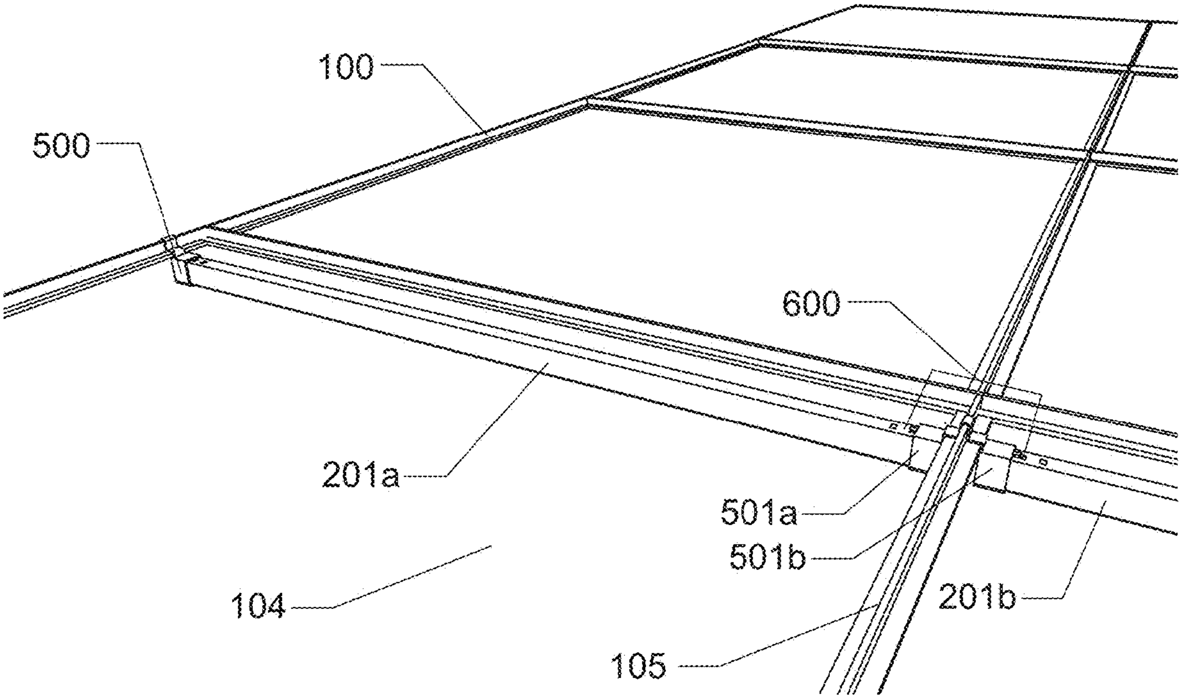
FIG. 7 illustrates the installation of both an end cap single-connector and a linear dual-connector onto a drop ceiling system.

FIG. 7 illustrates the installation of both end cap single-connector 500 and linear dual-connector 600 onto drop ceiling system 101. End cap single-connector 500 is installed at the terminating end of a first light segment 201*a*, completing the segment without connecting to another. The opposite end of first light segment 201*a* connects to a first enclosure 501*a* of linear dual-connector 600, while a second light segment 201*b* connects to a second enclosure 501*b* of linear dual connector 600. This configuration allows light segments 201 to be mounted in a straight-line design, extending from one module 104 to another.

Figure 8:
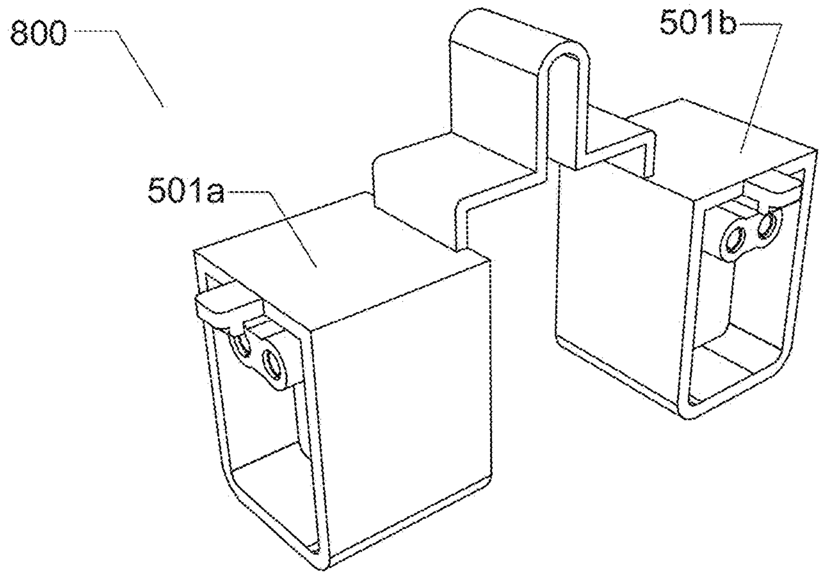
FIG. 8 illustrates an embodiment of a mount as an adjacent connector.

FIG. 8 illustrates an embodiment of mount 202 as an adjacent connector 800. Adjacent connector 800 links two light segments 201 at a 90-degree angle, allowing light segments 201 to be positioned on separate but neighboring modules 104. In this configuration, adjacent connector 800 can comprise two separate enclosure 501, which are connected by an inverted T-shaped bracket 502. One end of the bracket 502 attaches to the back side of the first enclosure 501*a*, while the other end connects to the side of the second enclosure 501*b*. This design positions the two light segments 201 in adjacent modules, forming a 90-degree angle, and enables the lighting system 100 to navigate around obstructions such as ceiling grid 105, ensuring flexibility in the layout of the lighting system 100.

Figure 9:
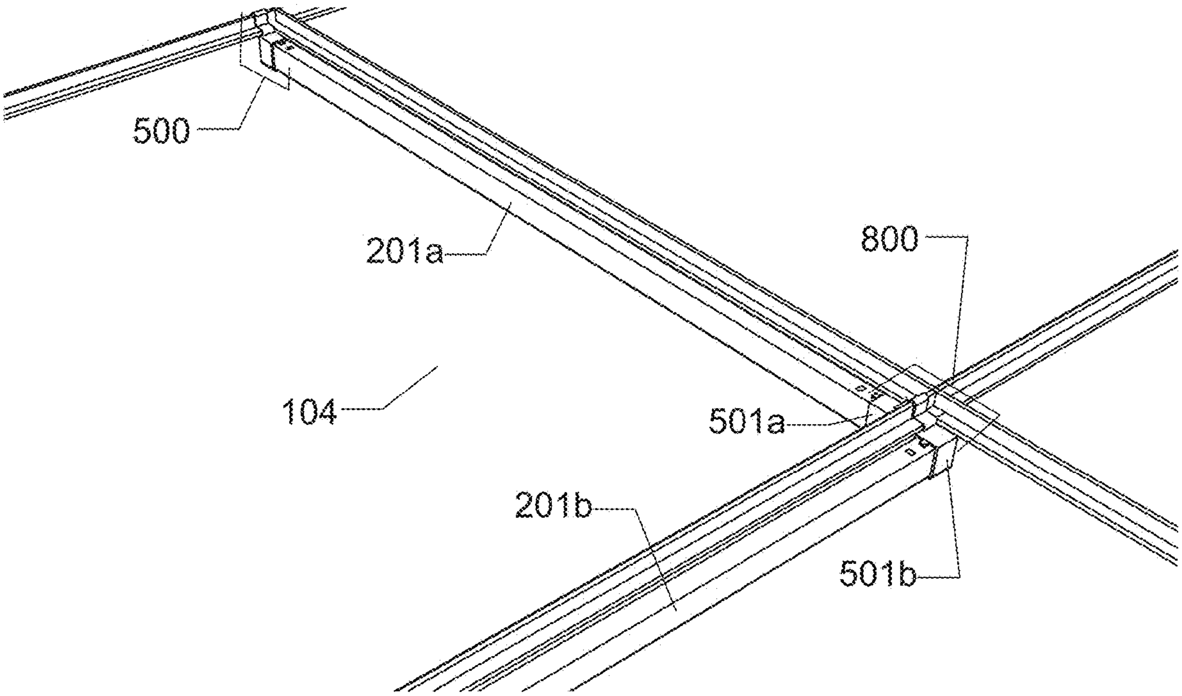
FIG. 9 illustrates the installation of an adjacent connector onto a drop ceiling system.

FIG. 9 illustrates the installation of an adjacent connector 800 onto drop ceiling system 101. One end of first light segment 201*a* can mount grid frame 102 through end cap single-connector 500, while the other end of first light segment 201*a* connects to first enclosure 501*a* of adjacent connector 800. Second light segment 201*b* connects to the second enclosure 501*b* of adjacent connector 800, forming a 90-degree angle with the first light segment 201*a*. Each light segment 201 are mounted to modules 104 that are directly adjacent to each other.

Figure 10:
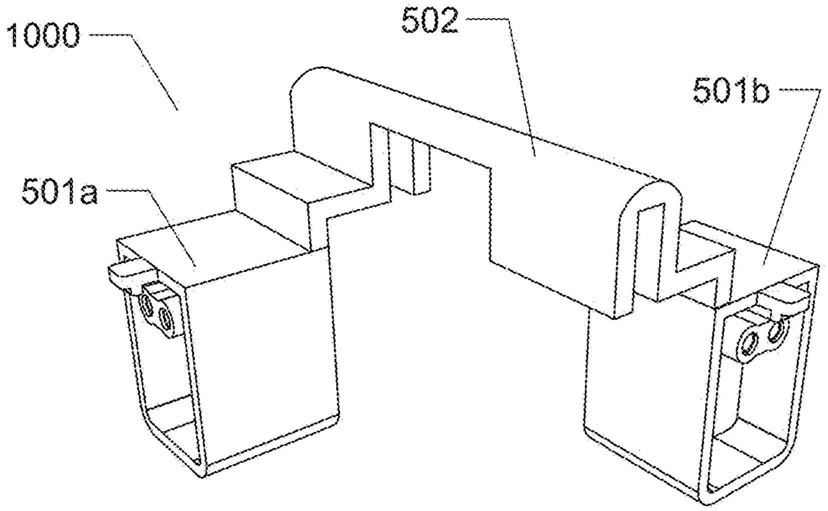
FIG. 10 illustrates an embodiment of a mount as a diagonally adjacent connector.

FIG. 10 illustrates an embodiment of mount 202 as a diagonally adjacent connector 1000. In this embodiment, mount 202 can comprise two separate enclosures 501, each front ends with openings 503 that face perpendicularly away from one other. Z-shaped bracket 502 is used to join the two enclosures 501, with one end of the bracket 502 attached to the back side of the first enclosure 501*a* and the other end attached to the side of the second enclosure 501*b*. This design positions the two light segments 201 diagonally adjacent to each other, creating a 90-degree angle between them, enabling the lighting system to form corners or navigate around obstructions such as ceiling grid 105 within a drop ceiling grid. This configuration allows for more flexible lighting design, providing adaptability for various room shapes and layouts.

Figure 11:
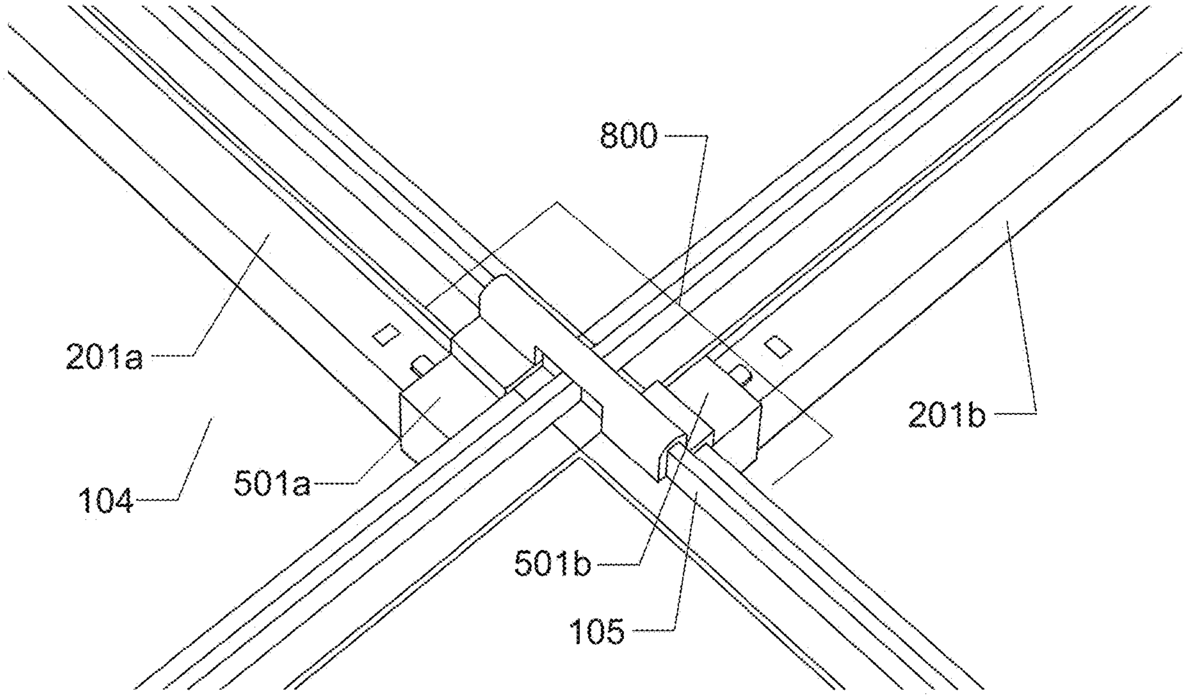
FIG. 11 illustrates the installation of a diagonally adjacent connector onto a drop ceiling system.

FIG. 11 illustrates the installation of a diagonally adjacent connector 800 onto drop ceiling system 101. In this embodiment, one end of first light segment 201*a* connects to first enclosure 501*a* of diagonally adjacent connector 800 while one end of second light segment 201*b* connects to second enclosure 501*b* forming a diagonal orientation relative to first light segment 201*a*. Each light segment 201 are mounted to modules 104 that are diagonally adjacent to each other.

Figure 12A:
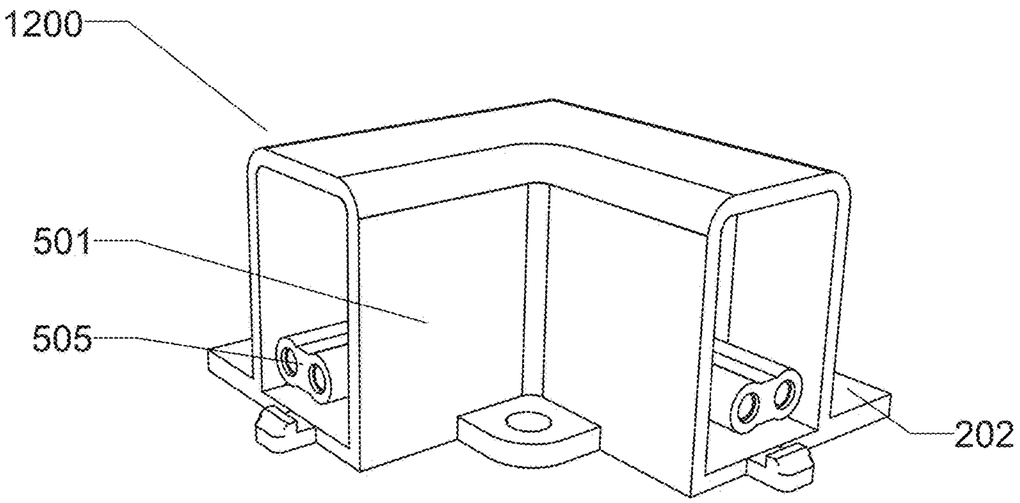
FIG. 12A illustrates an embodiment of a mount as an L-shaped connector.

FIG. 12A illustrates an embodiment of mount 202 as an L-shaped connector 1200. In this embodiment, two enclosures 501 are integrated into a unibody structure. Enclosure 501 can have an L-shaped form, with socket connector 505 at each end. Light segment 201 can attach to each mount 202 positioning light segments 201 at a 90-degree angle to one another. Additionally, bracket 502 can be a flat lip platform extending outward from the top surface of mount 202.

Figure 12B:
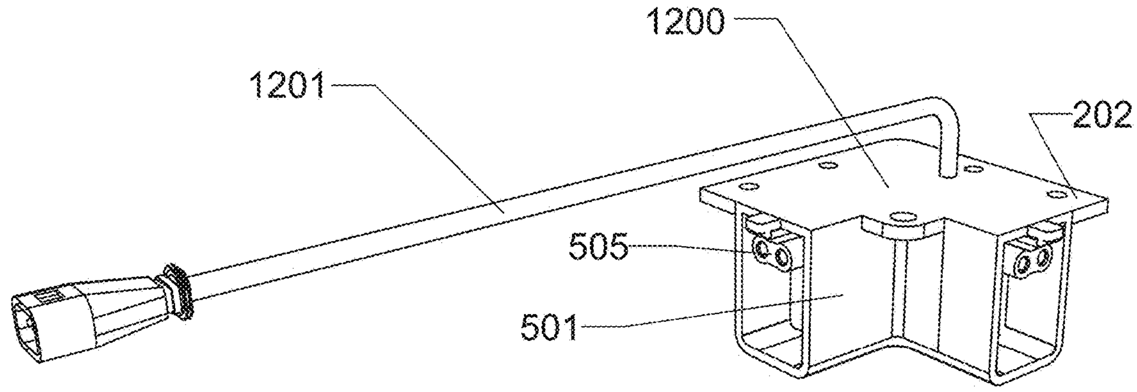
FIG. 12B illustrates an embodiment of a mount comprising a power cable.

FIG. 12B illustrates an embodiment of mount 202 comprising a power cable 1201. In this embodiment, one of mount 202 in lighting system 100 can comprise power cable 1201, which can be used to connect lighting system 100 into a power source, supplying power to the entire lighting system. Thus, when plug 301 is connected to socket connector 505, power is transferred from the power source through mount 202, linking each light segment 201 and enabling continuous illumination across the interconnected light segments.

Figure 13A:
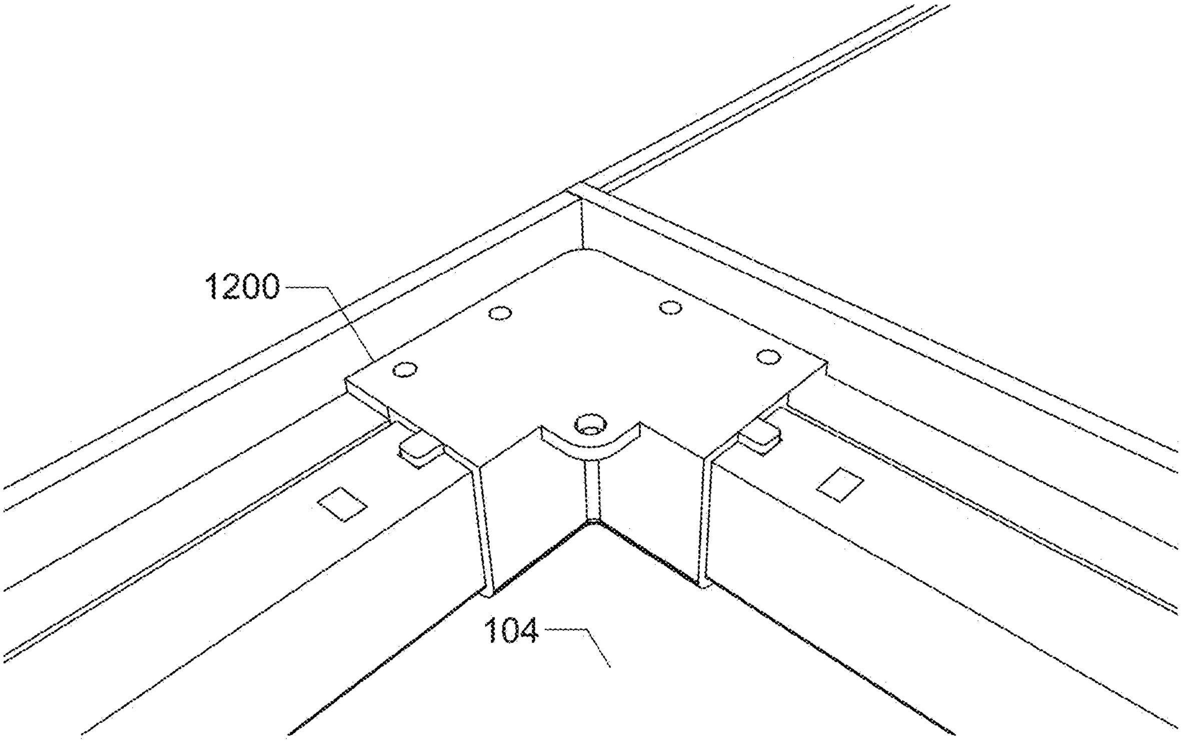
FIG. 13A illustrates how an L-shaped connector can be installed onto a drop ceiling system 101.

FIG. 13A illustrates how an L-shaped connector 1200 can be installed onto drop ceiling system 101. In this embodiment, the flat protruding portion of bracket 502 can rest on top of lips 106 of grid frame 102, allowing light segment 201 to be suspended below the grid frame. Additionally, the flat design of bracket 502 allows ceiling tiles 103 to be mounted on top of lighting system 100 without creating significant bulging, ensuring that ceiling tiles 103 remain flush with the surrounding tiles in drop ceiling system 103.

Figure 13B:
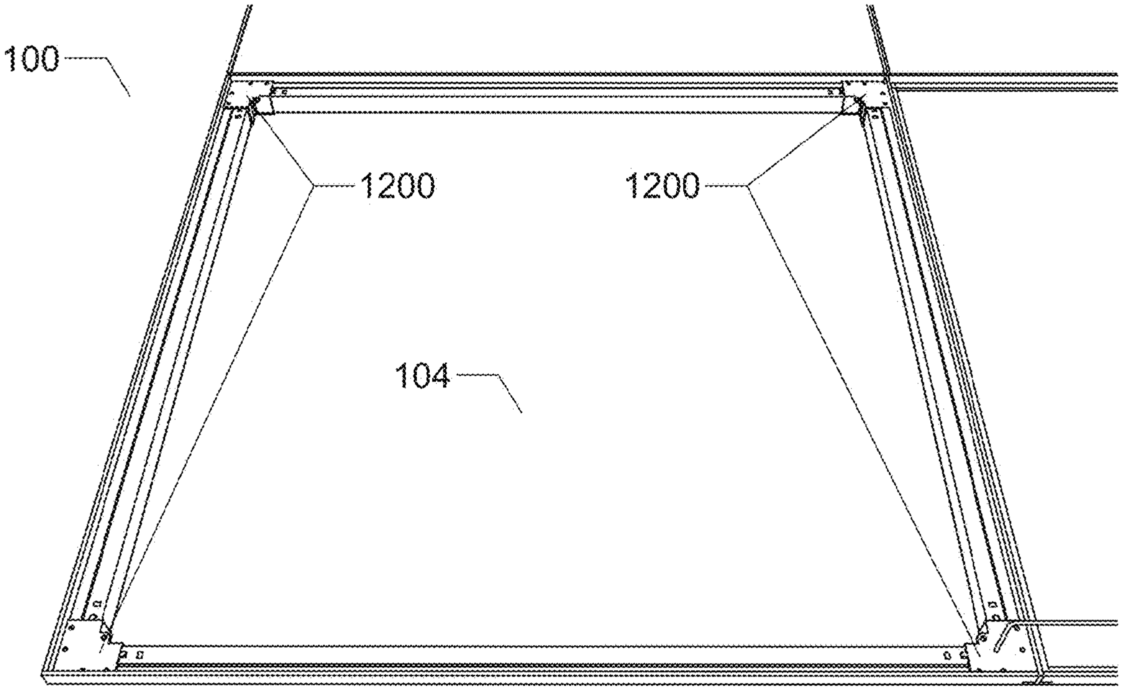
FIG. 13B illustrates an embodiment of a complete lighting system using only an L-shaped connector.

FIG. 13B illustrates an embodiment of a complete lighting system 100 using only L-shaped connector 1200. Using only L-shaped connector 1200 can allow for the creation of a quadrilateral lighting system, mountable within a single module 104 of the drop ceiling system.

Figure 14A:
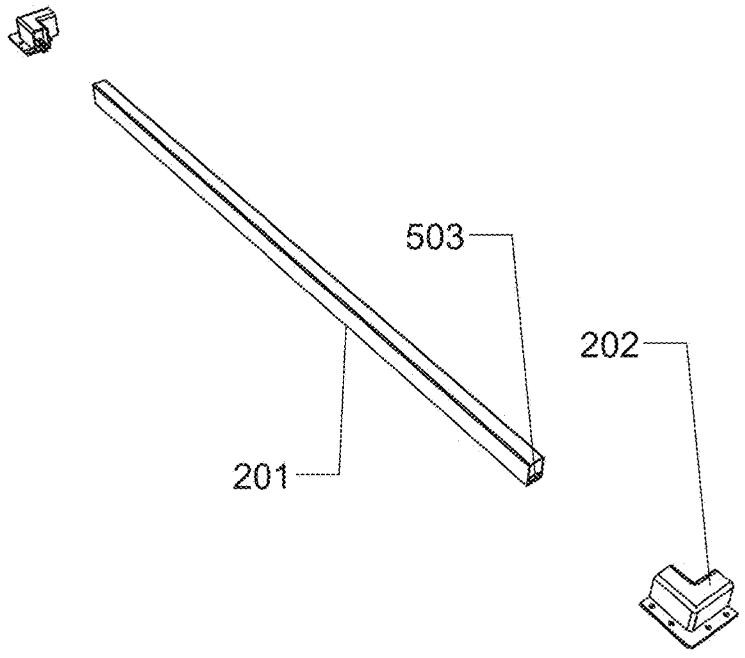
FIG. 14A illustrates the process of assembling a lighting system.

FIG. 14A illustrates the process of assembling lighting system 100. Initially, each light segments 201 is aligned with openings 503 of the corresponding mount 202. The alignment is crucial to ensure a proper fit and electrical connection between light segments 201 and mounts 202, facilitating a seamless assembly process and enhancing the overall reliability and performance of the lighting system.

Figure 14B:
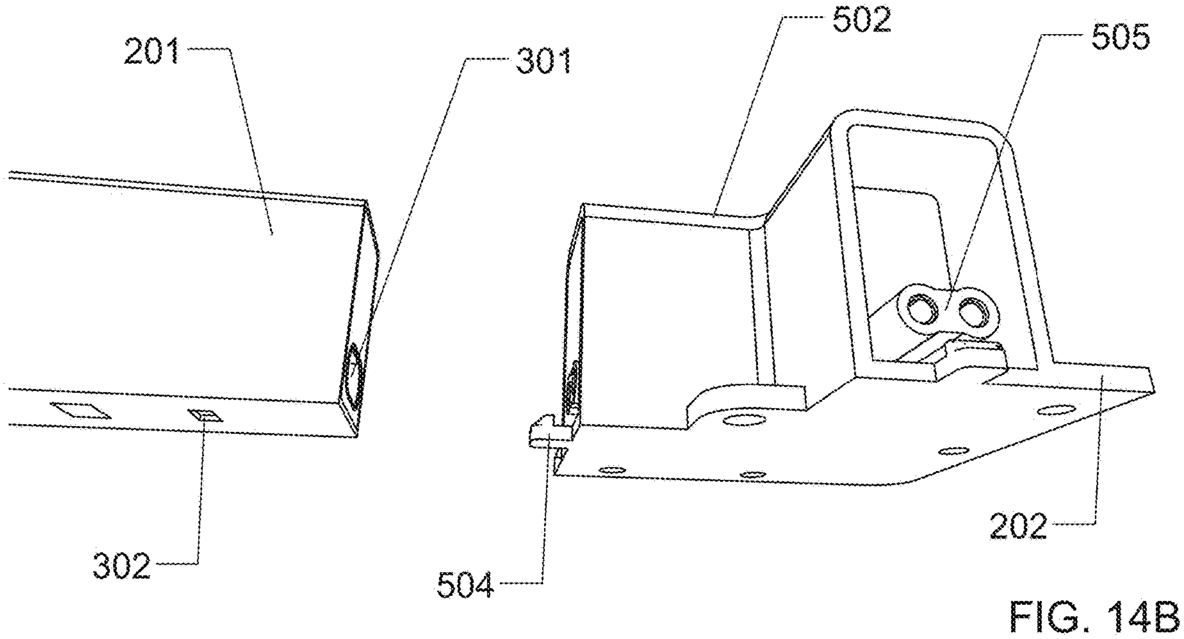
FIG. 14B illustrates a closer view of the connection points between light segments and a mount.

FIG. 14B illustrates a closer view of the connection points between light segments 201 and mount 202. During assembly, plug 301 on light segment 201 is aligned with and inserted into the corresponding socket connector 505 on mount 202. Inserting light segment 201 into openings 503 of mount 202 can also connect first fastener 302 on light segment 201 with second fastener 504 on mount 202. This connection not only secures the segments physically but also enables the flow of power and control signals between each segment, ensuring seamless operation.

Figure 14C:
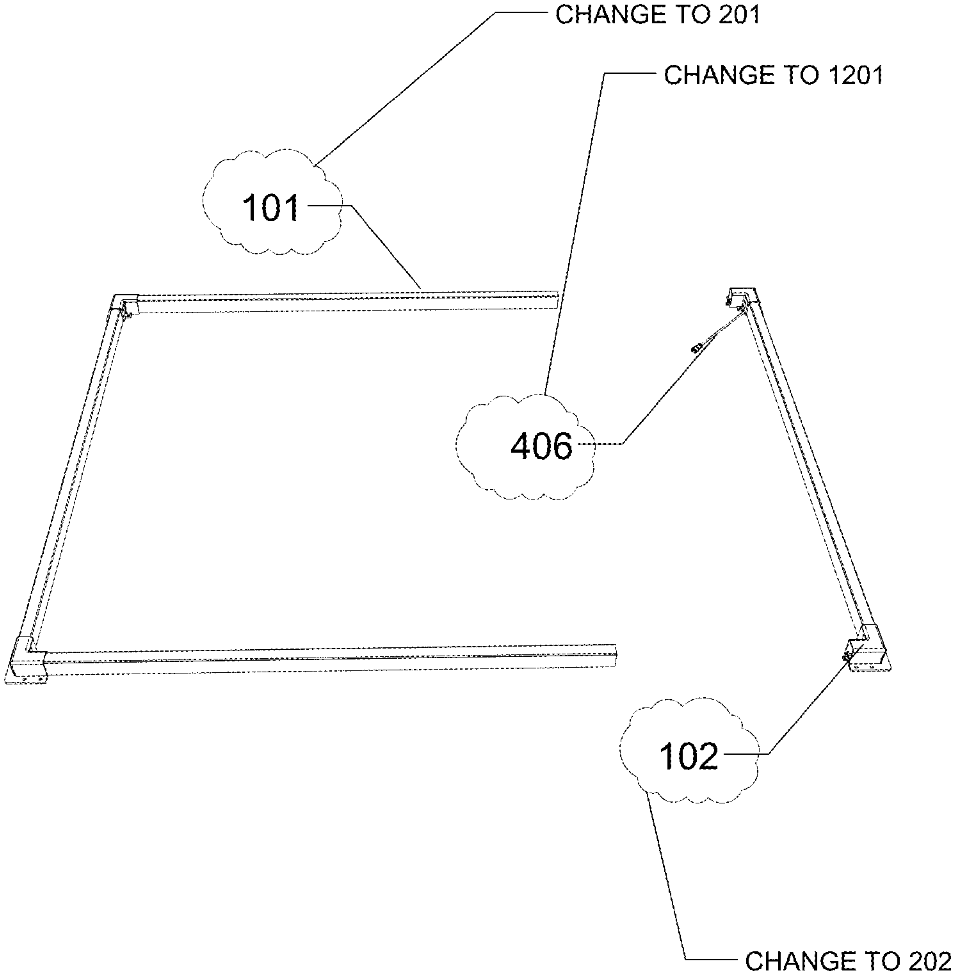
FIG. 14C illustrates the process of connecting multiple light segments through a mount.

FIG. 14C illustrates the process of connecting multiple light segments 201 through mount 202. Each light segments 201 is connected sequentially, allowing for a customized lighting structure based on the design requirements. Once all plugs 301 and socket connectors 505 are properly connected, one of the mounts 202 with power cable 1201 can be positioned near the power source for later connection.

Figure 15A:
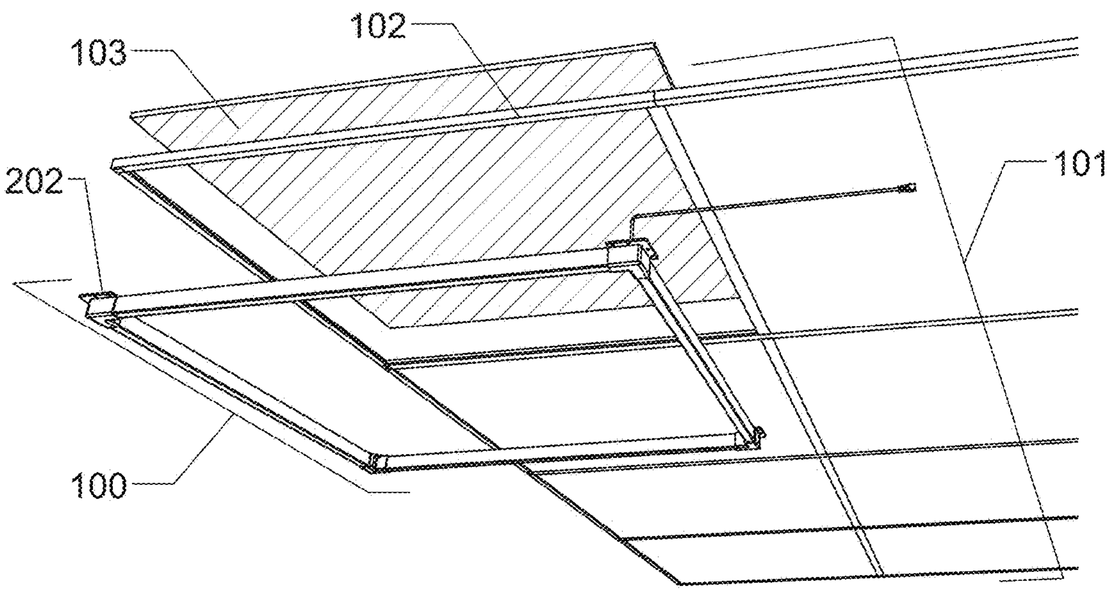
FIG. 15A illustrates installation of a lighting system onto a drop ceiling system.

FIG. 15A illustrates installation of lighting system 100 onto drop ceiling system 101. After forming the desired lighting system configuration, lighting system 100 can be securely mounted onto the ceiling using mount 202. Before mounting lighting system 100, it is necessary to remove the ceiling tile 103 from grid frame 102.

Figure 15B:
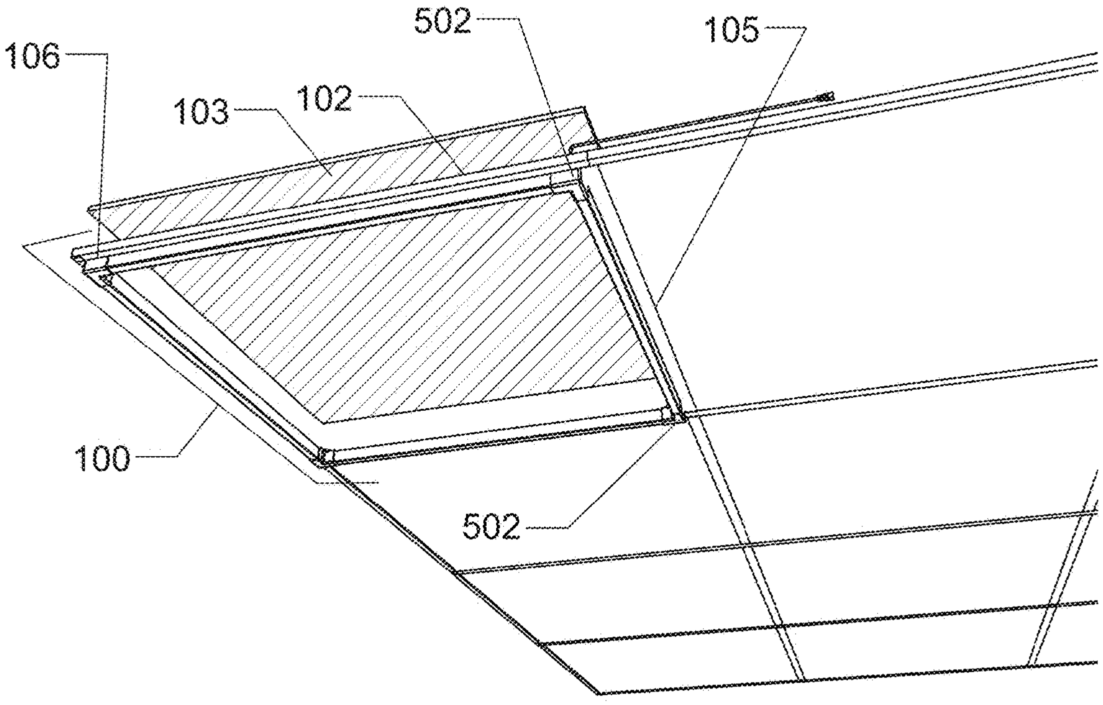
FIG. 15B illustrates a lighting system positioned within a grid frame.

FIG. 15B illustrates lighting system 100 positioned within grid frame 102. After ceiling tile 103 is removed, lighting system 100 can be inserted into the opening left by the removal of ceiling tile 103. An assembled lighting system 100 can be turned and put above ceiling grid 105. Then, bracket 502 can then rest on ceiling grid 105 or lips 106 of grid frame 102, providing stability and support for the lighting system 100.

Figure 15C:
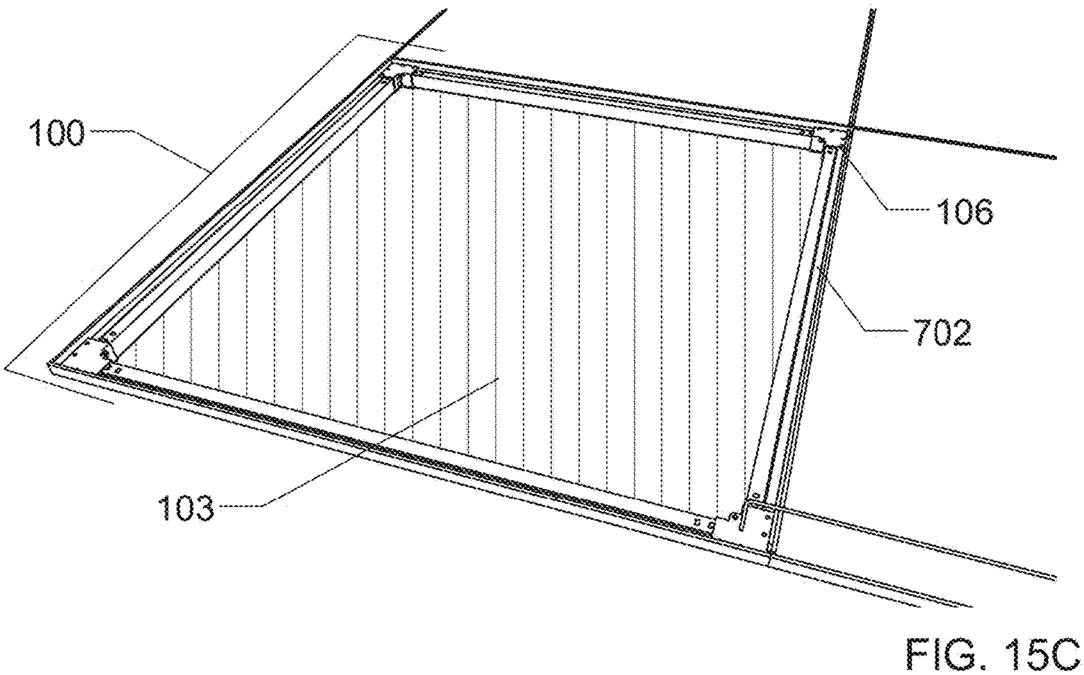
FIG. 15C illustrates a top view of a lighting system resting on lips of a grid frame.

FIG. 15C illustrates a top view of lighting system 100 resting on lips 106 of grid frame 702. This design allows for the easy reinstallation of ceiling tile 103 over lighting system 100 without requiring any modifications to the tile itself.

Figure 15D:
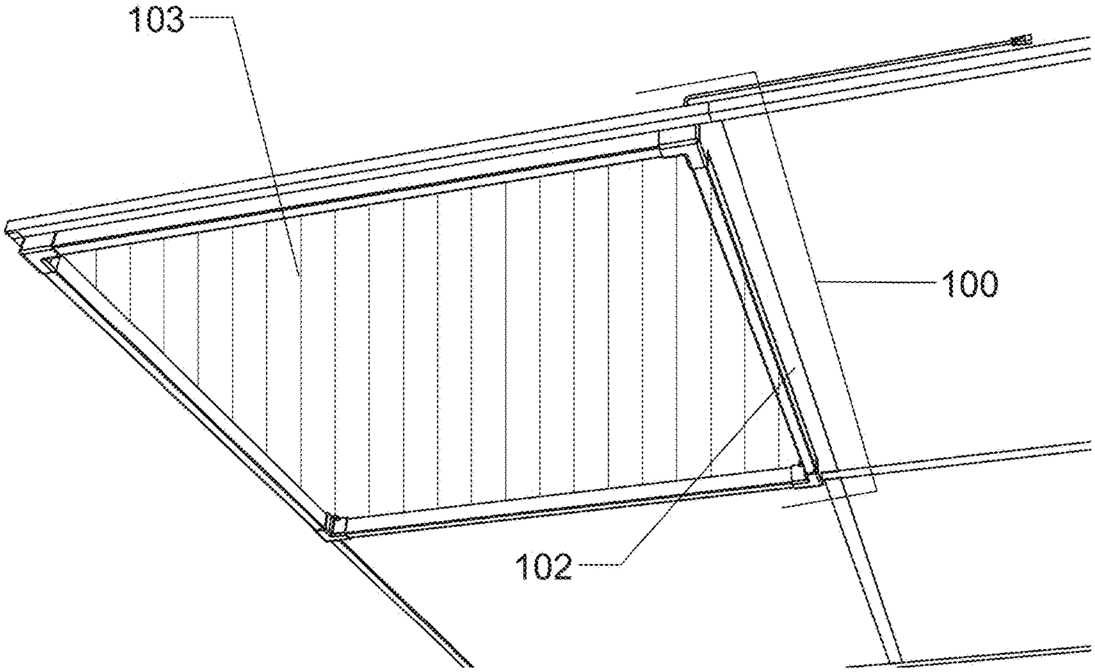
FIG. 15D illustrates a ceiling tile mounted back on top of a lighting system.

FIG. 15D illustrates ceiling tile 103 mounted back on top of lighting system 100. The design of lighting system 100 can also allow ceiling tile 103 be positioned on top of lighting system 100, flush with the surrounding grid tiles on grid frame 102, ensuring a seamless appearance in the ceiling. This integration enhances both the functionality and aesthetics of the installation.

Figure 15E:
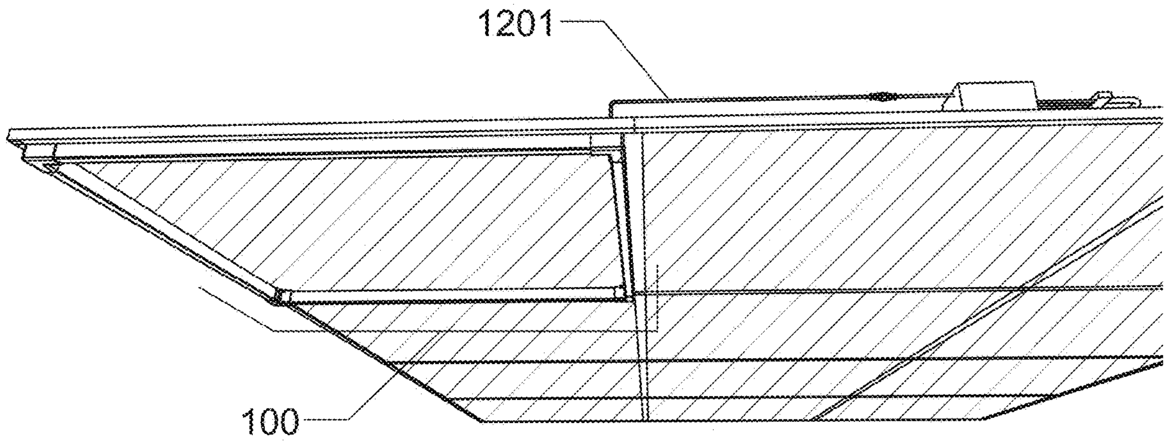
FIG. 15E illustrates a lighting system connected to a power source.

FIG. 15E illustrates lighting system 100 connected to a power source. After securely mounting lighting system 100 to the drop ceiling system, power cable 1201 can be plugged into the power source completing the electrical circuit. Once power flows through the system, lighting system 100 is activated, effectively illuminating the space. This setup not only enhances the aesthetics of the ceiling but also ensures efficient and functional lighting.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An Improved LED (light-emitting diode) lighting system comprising a plurality of elongated interconnectable light segments, each end of said light segment comprising an integrated plug;

a plurality of mounts, each of said mount configured to connect to and end of said light segments, wherein each of said mounts comprises an enclosure having an opening that comprises a first socket connector compatible with said integrated plug;

a bracket extending from said enclosure such that when said plurality of mounts are assembled with said plurality of elongated interconnectable light segments, said brackets configured to rest on a top surface of a drop ceiling system while said enclosure rests at least partially below the top surface of the drop ceiling system; and a power cable on one of said plurality of mounts, said power cable capable of receiving power from an external power source and delivering the power to said plurality of elongated interconnectable light segments.

2. The system of claim 1 wherein each light segment further comprises one or more LED strips, each said LED strip comprising a plurality of LED lights, wherein the positive terminal from said integrated plug is connected to the positive terminal of a first said LED strip, and the negative terminal of said integrated plug is connected to the negative terminal of a last said LED strip arranged in a series connection, with each LED strip arranged in a series connection; and one or more resistors connected to an LED strip of said one or more LED strips to regulate the current.

3. The system of claim 1 wherein said plurality of elongated interconnectable light segments and a plurality of mounts together form a shape that is configured to fit within a single grid square of the drop ceiling system.

4. The system of claim 1 wherein said bracket has an inverted U-shape form which serves as a hook that allows a terminating end of said light segment to be mounted on a vertical support of the drop ceiling system.

5. The system of claim 1 wherein said mount further comprises a second enclosure having a second opening that comprises a second socket connector, said second enclosure is connected to one of said plurality of mounts through said bracket.

6. The system of claim 5 wherein each said enclosure and said second enclosure positioned on opposite ends of said bracket connecting the backside of each said enclosures, with each of said socket connectors in said enclosures face outward allowing a straight-line configuration.

7. The system of claim 5 wherein one end of said bracket attached to a back side of said enclosure and the other end attached to the side of said second enclosure, enabling a 90-degree connection between two of said light segments.

8. The system of claim 5 wherein said bracket connects a back side of said enclosure to the side of said second enclosure, positioning said light segments at a 90-degree angle relative to each other for diagonal alignment allowing installation around obstructions.

9. The system of claim 8 wherein said bracket has a Z-shaped configuration.

10. The system of claim 5 wherein said bracket has an inverted T-shape configuration.

11. The system of claim 5 wherein said mount comprises an L-shaped unibody structure configured to house said enclosure and said second enclosure on each end such that said light segments are positionable at a 90-degree angle relative to each other.

12. The system of claim 11 wherein said mount comprises a flat lip bracket that extends outward from a top surface of said mount for attachment to a ceiling.

13. The system of claim 1, wherein said light segment further comprises a first fastener, and said mount further comprises a second fastener, wherein said first fastener is configured to securely mate with said second fastener, allowing for a quick-release, tool-less connection between said light segment and said mount.

14. The system of claim 13 wherein said quick-release connection is a catch and latch fastening mechanism.

* * * * *